United States Patent
Artner et al.

[11] Patent Number: 6,141,935
[45] Date of Patent: Nov. 7, 2000

[54] STRUCTURAL MEMBER

[75] Inventors: Bernd Artner, Renningen; Albrecht Krueger-Eppstein, Stuttgart, both of Germany

[73] Assignee: DaimlerChrysler AG, Stuttgart, Germany

[21] Appl. No.: 09/104,001

[22] Filed: Jun. 24, 1998

[30] Foreign Application Priority Data

Jun. 24, 1997 [DE] Germany .............................. 197 26 720

[51] Int. Cl.⁷ .............................. B62D 21/15; E04C 3/04
[52] U.S. Cl. ...................... 52/735.1; 52/731.6; 52/737.6; 52/731.2; 52/745.19; 29/897.2; 29/897.35; 296/188
[58] Field of Search ................................ 52/735.1, 731.6, 52/731.2, 732.1, 653.2, 729.5, 731.3, 732.2, 737.6, 745.19; 29/897.2, 897.31, 897.35; 296/146.6, 188; 293/102, 122; 138/171, 115, 116, 117; 228/17.5

[56] References Cited

U.S. PATENT DOCUMENTS

| | | | |
|---|---|---|---|
| 726,801 | 4/1903 | Maxwell | 52/115 |
| 870,356 | 11/1907 | Gammeter | 52/116 X |
| 1,179,820 | 4/1916 | Gilliland | 52/737.6 X |
| 4,768,323 | 9/1988 | Coutant et al. | 52/731.6 X |
| 4,838,606 | 6/1989 | Furubayashi et al. | 296/188 |
| 5,186,251 | 2/1993 | Joshi | 138/171 X |
| 5,340,178 | 8/1994 | Stewart et al. | |
| 5,395,036 | 3/1995 | Sturrus | |
| 5,813,718 | 9/1998 | Masuda et al. | 296/146.6 |

FOREIGN PATENT DOCUMENTS

| | | |
|---|---|---|
| 31 44 844 | 6/1982 | Germany . |
| 44 13 641 | 6/1995 | Germany . |
| 195 25 347 | 7/1996 | Germany . |
| 195 45 069 | 4/1997 | Germany . |
| 141368 | 6/1997 | Japan . |
| 156368 | 6/1997 | Japan . |
| 767313 | 9/1980 | U.S.S.R. .............................. 52/731.2 |
| 128322 | 6/1919 | United Kingdom .................. 52/731.6 |

*Primary Examiner*—Laura A. Callo
*Attorney, Agent, or Firm*—Evenson, McKeown, Edwards & Lenahan, P.L.L.C.

[57] ABSTRACT

A structural member has in its cross-sectional plane at least two closed hollow-section chambers which are produced by rolling forming and which are made of a single sheet metal part, the at least two hollow-section chambers being provided with at least one longitudinal seam. Between the at least two hollow-section chambers, at least one intermediate web is provided which forms one piece with the walls of the hollow-section chambers. The at least one intermediate web starts out from the intermediate seam and, on the longitudinal side facing away from the longitudinal seam, is connected with an interior side of the sheet metal part.

9 Claims, 2 Drawing Sheets

STRUCTURAL MEMBER

BACKGROUND AND SUMMARY OF THE INVENTION

This application claims the priority of German Application No. 197 26 720.3, filed Jun. 24, 1997.

The invention relates to a structural member and, more particularly, to a structural member which, in its cross-sectional plane, has at least two closed hollow-section chambers which are produced by rolling forming and which are made of a single sheet metal part, the at least two hollow-section chambers being provided with at least one longitudinal seam.

Strip-shaped structural members, as used in motor vehicle doors as a shock absorbing device, as a bumper reinforcement or as a vehicle body member, are known from German Patent Document DE 195 25 347 C1. That patent document describes a strip-shaped structural member having a sectional part which has in its cross-sectional plane at least two closed chambers produced by sheet metal forming. Between these two closed chambers, an open area is situated which can be closed by reinforcing parts. That invention is based on the fact that the sectional part is produced from a single sheet metal strip. However, an absolutely one-piece production of the strip-shaped structural member cannot be achieved, because that patent document is based on additional reinforcing parts which are required for closing the open area between the two hollow chambers at least in portions. The reinforcing parts required for this purpose must therefore be mounted separately. This does not achieve a produced member which will be in one piece. In addition, the mounting of separate reinforcing parts requires relatively high expenditures and is cost-intensive.

In order to be able to achieve a satisfactory stability of the structural member, it also required in the above-mentioned patent document that intermediate-wall-type spacing parts are arranged in the open area between the hollow chambers of the profile part. These spacing parts incur additional costs and additional manufacturing expenditures.

Another process for manufacturing a motor vehicle bumper is described in U.S. Patent Document U.S. Pat. No. 5,395,036. This patent document describes a process for the one-piece manufacturing of a motor vehicle bumper. However, this construction is not very resistant to bending. The mentioned construction has neither spacing parts nor reinforcing parts, as they are mentioned, for example, in German Patent Document DE 195 25 347 C1. Stability or a high resistance of the construction to bending was not at all important in the case of the process mentioned in the U.S. patent document.

Furthermore, a bumper for motor vehicles which consists of a one-piece sectional member is described in German Patent document DE 31 44 844. In comparison to the U.S. patent document, in this German patent document, a higher stability of the bumper is achieved in that interior webs are provided in the construction. These interior webs cause a corresponding stability. However, the sectional member is not welded as in the case of the other two patent documents but is extruded or drawn. This therefore represents a completely different manufacturing process.

In principle, U.S. Pat. No. 5,340,178 is similar to German Patent Document DE 31 44 844 C2. The U.S. patent document also has interior webs which are used for reinforcing the construction. However, the sectional member is also not welded but rather extruded or drawn.

It is an object of the present invention to provide a structural member made of a low-cost starting material which has a high moment of resistance to bending and which can be produced by means of the manufacturing process by profile rolling which can be carried out at low cost and in a reliable manner with respect to the process.

According to the present invention, this object is achieved by providing a structural member which, in its cross-sectional plane, has at least two closed hollow-section chambers which are produced by rolling forming and which are made of a single sheet metal part, the at least two hollow-section chambers being provided with at least one longitudinal seam. Between the at least two hollow-section chambers at least one intermediate web is provided which forms one piece with the walls of the hollow-section chambers. The at least one intermediate web starts out from the longitudinal seam and is connected on the longitudinal side facing away from the longitudinal seam, with an interior side of the sheet metal part.

As a result of the fact that at least one intermediate web extends between the two hollow-section chambers, the structural member acquires a very high resistance to bending and stability. High load demands can therefore be met. Because of the one-piece construction of the hollow-section chambers and of the intermediate web, the structural member can be produced particularly easily. It therefore requires no unnecessary welding together of separate cross-struts. In particular, the structural member also meets aerodynamic requirements.

Together with the intermediate web, the whole structural component can be produced from one coil width. This permits particularly low-cost production of the structural member. The whole structural member must be connected only at two points by means of conventional processes, for example, by welding. This is advantageously made possible by the special shape of the structural member.

Advantageous further developments and embodiments of the invention are described herein.

Other objects, advantages and novel features of the present invention will become apparent from the following detailed description of the invention when considered in conjunction with the accompanying drawings.

DETAILED DESCRIPTION OF THE DRAWINGS

Figure 1:
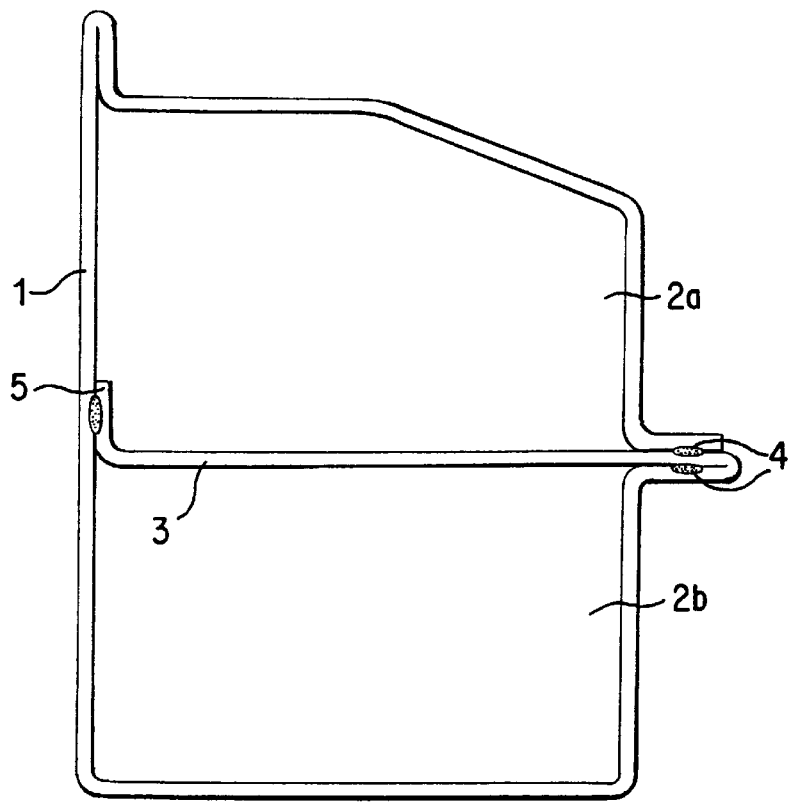
FIG. 1 is a sectional view of a two-chamber hollow section with an intermediate web according to the invention.

FIG. 1 illustrates a one-piece structural member 1 which consists of two hollow-section chambers 2a, 2b and an intermediate web 3. The intermediate web 3 divides the two hollow-section chambers 2a, 2b into approximately equally large chambers. By means of this division, a particularly high stability is achieved because the intermediate web 3 provides a uniform support. The intermediate web 3 starts out from a longitudinal seam 4 and, at its end portion facing away from the longitudinal seam 4, is welded to the interior side of the longitudinal wall of the hollow-section chamber 2a. Since the whole structural member 1 consists of a single metal sheet, the end of the intermediate web 3 simultaneously represents an end of the metal sheet. The other end of the metal sheet is welded to the start of the intermediate web 3 on the other longitudinal side.

The connection of the end piece of the intermediate web 3 with the interior wall of the hollow-section chamber 2a, as illustrated in FIG. 1, takes place by means of a folding 5. By means of this folding 5, a particularly advantageous connection can be established with the interior side of the hollow-section chamber 2a by means of welding or riveting.

Figure 2:
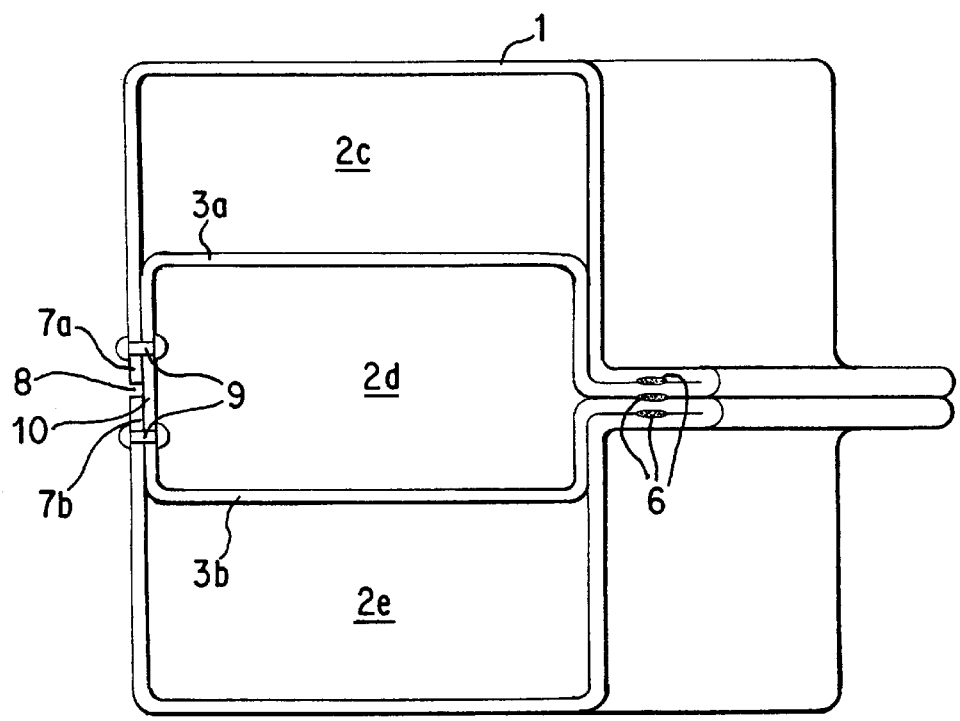
FIG. 2 is a sectional view of a three-chamber hollow section having two intermediate webs which extend in a curved manner according to the invention.

As illustrated in FIG. 2, the structural member 1 in this embodiment consists of three hollow-section chambers 2c, 2d, 2e which are formed by two intermediate webs 3a, 3b. The intermediate webs 3a, 3b are arranged such that an interior hollow section 2d is formed. The interior hollow section 2d has only a single longitudinal seam 6 which coincides with the first exterior longitudinal seam of the exterior hollow-section chambers 2c, 2e. As the result of the interior hollow-section chamber 2d, the structural member 1 achieves high stability and resistance to bending without the requirement of an additional welding operation since the longitudinal seam 6 of the interior hollow section 2d is identical with the first longitudinal seam of the exterior hollow-section chambers 2c, 2e.

The metal sheet of the structural member 1 has two longitudinal sides 7a, 7b whose ends, on the side facing away from the first longitudinal seam 6, are connected by a second longitudinal seam 8. The connection of the longitudinal sides 7a, 7b can also take place in that these are fastened on the connection wall 10 by means of rivets 9. This connection can naturally also take place by other measures.

Figure 3:
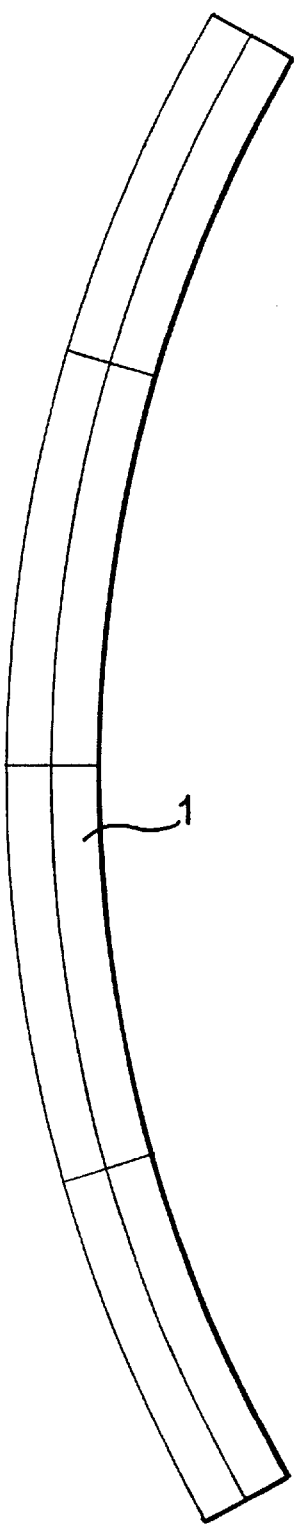
FIG. 3 is a top view of a structural member produced according to the invention.

As illustrated in FIG. 3, the structural member has a longitudinal curvature. In this case, the curvature radius may, for example, be 2.5 m. The structural member 1 may be bent with a constant radius directly in a conventional profiling system without any additional handling. The structural member 1 may consist of steel or aluminum. If light sheet metal is used, the seams can be constructed as rows of rivets.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A structural member, consisting of:
   only two closed hollow-section chambers, viewed in a cross-sectional plane, produced via rolling forming and made of a single sheet metal part, said two hollow-section chambers being provided with at least one longitudinal seam;
   only one intermediate web arranged between the only two hollow-section chambers, said intermediate web forming one piece with a longitudinal wall of one of the only two hollow-section chambers;
   wherein said intermediate web extends from the longitudinal seam and is connected via a fold on an interior side of the longitudinal wall opposite the longitudinal seam.

2. Structural member according to claim 1, wherein the one end of the single sheet metal part that has been formed to be the intermediate web is connected on the interior side via welding or riveting.

3. Structural member according to claim 1, wherein the at least two hollow-section chambers extend in a curved manner in the longitudinal direction.

4. A structural member, comprising:
   two closed exterior hollow-section chambers, viewed in a cross-sectional plane, produced via rolling forming and made of a single sheet metal part, the two hollow-section chambers being provided with at least one longitudinal seam; and
   two intermediate webs between the two exterior hollow-section chambers, wherein the two intermediate webs are situated parallel to one another to form an interior hollow-section chamber.

5. Structural member according to claim 4, wherein a longitudinal seam of the interior hollow-section chamber coincides with a first exterior longitudinal seam of the exterior hollow-section chambers.

6. Structural member according to claim 5, wherein ends of the single sheet metal part formed to be a longitudinal wall of the external hollow-section chambers of the single sheet metal part are connected with one another by a second exterior longitudinal seam on a side facing away from the first exterior longitudinal seam.

7. Structural member according to claim 5, wherein on a side facing away from the first exterior longitudinal seam, the two intermediate webs are connected with one another by a connection wall, and ends of the sheet metal part formed to be longitudinal walls of the external hollow-section chambers are fastened to the connection wall.

8. Structural member according to claim 7, wherein the ends of the sheet metal part formed to be longitudinal walls of the external hollow-section chambers are fastened to the connection wall by rivets.

9. A manufacturing process for a structural member which, in its cross-sectional plane, consists of only two closed hollow-section chambers provided with at least one longitudinal seam and only one intermediate web, the process comprising the acts of:
   rolling forming a single sheet metal part into said two closed hollow-section chambers by performing the following acts:
   a) providing said one intermediate web forming one piece with walls of said two closed hollow-section chambers between said two closed hollow-section chambers;
   b) extending said intermediate web from the at least one longitudinal seam and connecting said intermediate web via a fold on an interior side of a longitudinal wall of one of said two closed hollow-section chambers opposite the longitudinal seam.

* * * * *